United States Patent [19]

Alexander

[11] Patent Number: 4,538,043
[45] Date of Patent: Aug. 27, 1985

[54] WATER SHIELD FOR A METAL DISINTEGRATOR DEVICE

[76] Inventor: Rayburn G. Alexander, 569 Hawthorne Ave., San Bruno, Calif. 94066

[21] Appl. No.: 496,887

[22] Filed: May 23, 1983

[51] Int. Cl.$^3$ .............................................. B23P 1/08
[52] U.S. Cl. ................................. 219/69 V; 219/69 E; 219/69 D; 219/68
[58] Field of Search ............... 219/69 D, 69 E, 69 V, 219/69 R, 68, 72, 121 PM, 121 PN, 121 P

[56] References Cited

U.S. PATENT DOCUMENTS

| | | | |
|---|---|---|---|
| 2,580,398 | 1/1952 | Braswell | 219/69 V |
| 3,833,785 | 9/1974 | Roach | 219/69 V |
| 4,087,670 | 5/1978 | Miller | 219/72 |

FOREIGN PATENT DOCUMENTS 0618603  3/1927  France ............... 219/69 D

Primary Examiner—M. H. Paschall
Attorney, Agent, or Firm—Fliesler, Dubb, Meyer & Lovejoy

[57] ABSTRACT

Water shield (38) provided for a metal piece disintegrator (10) of the type having a longitudinally extending quill (12) holding a longitudinally extending electrode (16) at one end (14). A vibrating structure (20) serves for longitudinally vibrating the electrode (16) and a fluid delivery system (30) serves for delivering a stream of pressurized liquid coolant generally parallel to the electrode and against a broken piece of metal (32) embedded in a metallic member (34). Tubular member (40) is about at least one end (14) of the quill (12). A first end portion (46) of the tubular member (40) is positionable generally adjacent the electrode (16). A piston (48) is in tight-fitting slidable relation against the inner wall portion (42) of the tubular member (40). The piston (48) is generally sealingly attached to the quill (12) adjacent its one end (14). The tubular member (40) is selectively longitudinally positionable in releasable fixed relation relative to the electrode (16). Coolant discharged against the broken piece of metal (32) is prevented from splashing back upon the operator and from splashing uncontrollably laterally from the broken piece of metal (32) which is embedded in the metallic member (34).

10 Claims, 2 Drawing Figures

WATER SHIELD FOR A METAL DISINTEGRATOR DEVICE

DESCRIPTION

TECHNICAL FIELD

This invention relates to a water shield usable with a metal disintegrator which is used to remove broken-off taps, drill bits and the like.

BACKGROUND ART

Metal disintegrators are used to move broken taps, drill bits, and the like from pieces of bulk metal in which they have broken off. The metal disintegrators operate by charging an electrode to, for example, about 28 volts dc with the electrode positioned coaxial with and just above the broken-off piece of metal. The electrode is then vibrated longitudinally so as to be alternately close enough to cause a spark to flow from the electrode to the broken-off piece of metal and far enough to not spark from the electrode to the broken-off piece of metal. Generally, the rate of vibration will be of the order of 50 or 60 Hz. A stream of liquid coolant, generally water with a small amount of oil intermixed with it, is propelled under pressure generally through a longitudinal passage in the electrode and onto the broken-off piece of metal. As the metal disintegrates and is converted into a powder, the liquid serves as a coolant and also sweeps away the disintegrated powdered metal.

A significant problem with the metal disintegrators of the prior art is that water at relatively high pressure, for example 50 to 100 psig, sprays back upon the operator and generally sprays onto everything located near the broken-off piece of metal. Most operators of disintegrators simply utilize towels or rags positioned to try to catch some of the splashed back coolant. The result is far from ideal.

The present invention is directed to overcoming one or more of the problems as set forth above.

DISCLOSURE OF THE INVENTION

In accordance an embodiment of the present invention, a water shield is provided for use with a metal disintegrator of the type having a longitudinally extending quill having one end adapted to hold a longitudinally extending electrode, the electrode having a discharge end spaced from the quill, vibrating means for longitudinally vibrating the electrode, and fluid delivery means for delivering a stream of pressurized liquid coolant generally parallel to the electrode and against a broken piece of metal embedded in a metallic member. The water shield comprises a rigid tubular member having an inner wall defining an interior tubular cavity positionable in surrounding relation about at least the one end of the quill and having a first end portion positionable generally adjacent the electrode. A piston is provided which has an outer periphery in tight-fitting sliding relation with the inner wall portion of the tubular member and which is generally sealingly attached to the quill adjacent its one end. Positioning means are provided for selectively longitudinally positioning the tubular member in releasably fixed relation relative to the electrode.

In accordance with another embodiment of the present invention, an improvement is provided in a metal disintegrator having a longitudinally extending quill having one end adapted to hold a longitudinally extending electrode, the electrode having a discharge end spaced from the quill, vibrating means for longitudinally vibrating the electrode and fluid delivery means for delivering a stream of pressurized liquid coolant generally parallel to the electrode and against a broken piece of metal embedded in a metallic member. The improvement comprises a rigid tubular member having an inner wall defining an interior tubular cavity positioned in surrounding relation about at least the one end of the quill and having a first end positioned generally adjacent the electrode. A piston is provided which has an outer periphery in tight-fitting sliding relation with the inner wall portion of the tubular member and which is generally sealingly attached to the quill adjacent its one end. Positioning means are provided for selectively longitudinally positioning the tubular member in releasably fixed relation relative to the electrode.

An accurately positionable water shield is provided in accordance with the present invention. The water shield prevents back splashing and side splashing of the liquid coolant used with a metal disintegrator. Very precise location of the water shield is a feature of the invention. The water shield is preferably transparent whereby the operator can observe the action of the disintegrator. Also, in accordance with one embodiment of the present invention, a flexible and deformable sleeve can be attached to the tubular member to extend longitudinally from one end of the tubular member and to form an extension of the interior tubular cavity to thereby allow the electrode to be even more closely surrounded so as to more fully prevent the splashback of liquid coolant.

BRIEF DESCRIPTION OF DRAWINGS

The invention will be better understood by reference to the figures of the drawings wherein.

BEST MODE FOR CARRYING OUT THE INVENTION

Figure 1:
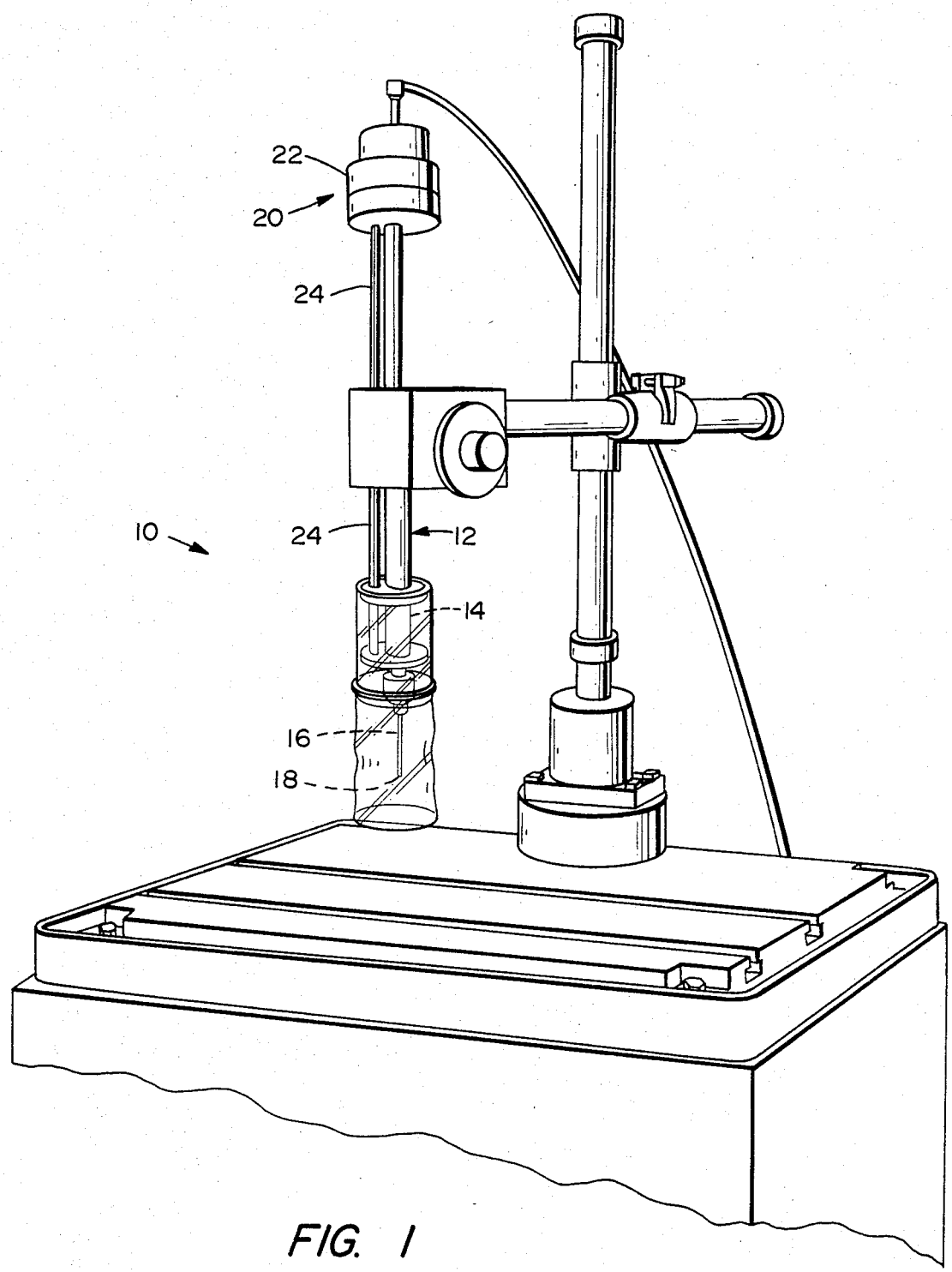
FIG. 1 illustrates a metal disintegrator which a water shield in accordance with the present invention is attached.
Figure 2:
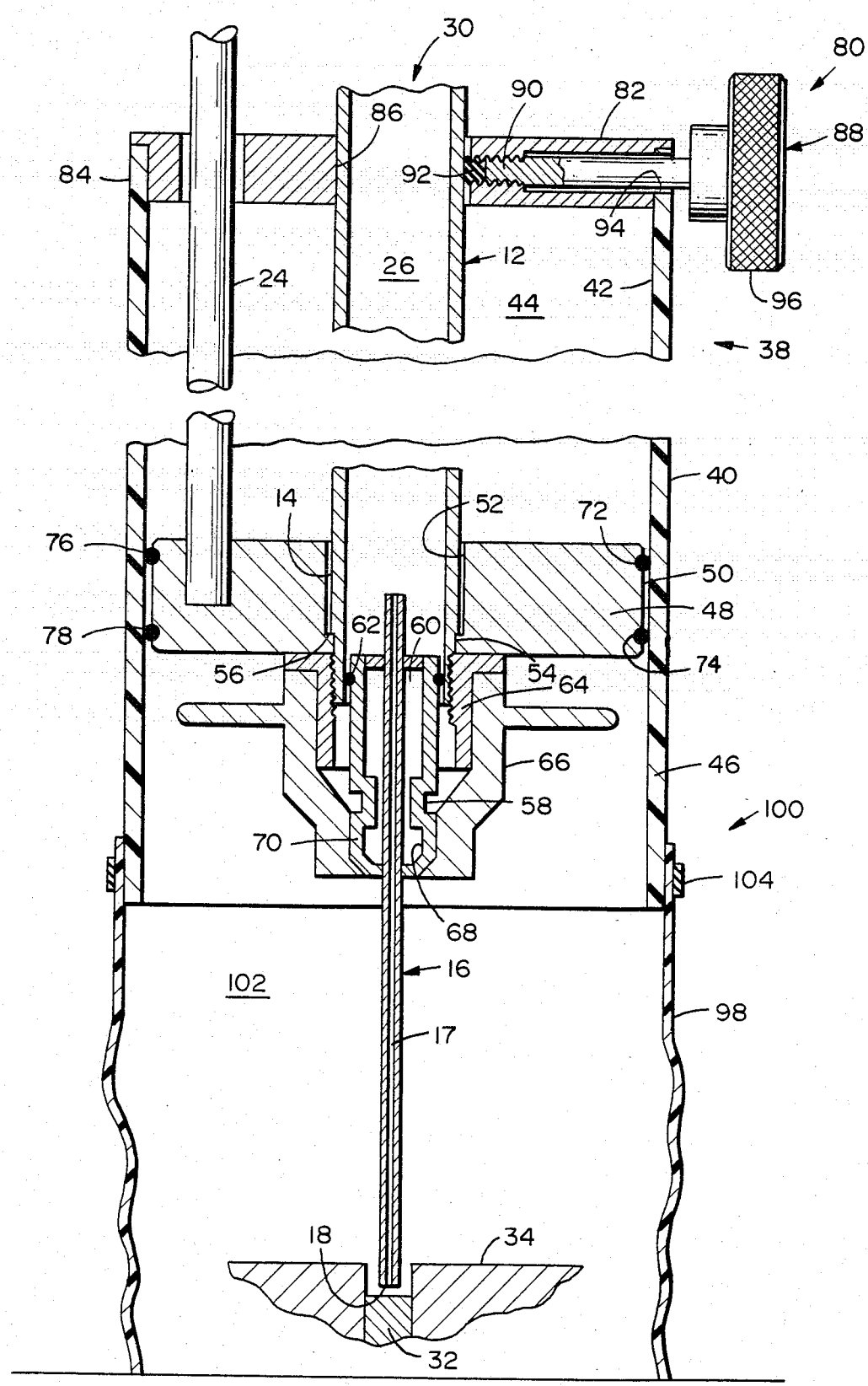
FIG. 2 illustrates a side section view of a water shield in accordance with an embodiment of the present invention.

Adverting to FIGS. 1 and 2, there is illustrated a metal disintegrator 10 having a longitudinally extending quill 12 having one end 14 adapted to hold a longitudinally extending electrode 16, the electrode 16 having a discharge end 18. The electrode 16 is hollow, having a passage 17 extending longitudinally therethrough from the quill 12 and through which coolant liquid from a coolant liquid source (not shown) flows. The discharge end 18 of the electrode 16 is spaced from the quill 12.

Vibrating means 20, in the embodiment illustrated a vibrator 22 along with a vibrator rod 24, is provided for longitudinally vibratiang the electrode 16. An interior 26 of the quill 12 and the internal fluid passage 17 in the electrode 16 serve as means 30 for delivering a stream of pressurized liquid coolant generally parallel to the electrode 16 and against a broken piece of metal 32 embedded in a metallic member 34. The broken piece of metal 32 might be, for example, a broken-off drill bit or the like.

The electrode 16 is generally kept at a desired dc potential, for example, at about 28 volts dc, through connection to a conventional power source 36. The vibrator 22 then vibrates the vibrator rod 24 longitudinally, thus alternately bringing the discharge end 18 of the electrode 16 close enough to the broken-off piece of metal 32 to allow sparking and far enough away from the broken piece of metal 32 so that sparking does not occur. Generally, the frequency of oscillation will be about 50 to 60 Hz. As a liquid stream flows out of the discharge end 18 of the electrode 16, it impinges upon the broken piece of metal 32 and sweeps away debris caused by the sparking from the discharge end 18 of the electrode 16 to the broken piece of metal 32.

Adverting now principally to FIG. 2, and in accordance with the present invention, a water shield 38 is provided for containing the splashed back liquid coolant. The water shield 38 includes a rigid tubular member 40 having an inner wall 42 defining an interior tubular cavity 44. The interior tubular cavity 44 is positionable in surrounding relation about at least the one end 14 of the longitudinally extending quill 12. The tubular member 40 has a first end portion 46 which is positionable generally adjacent the electrode 16. The tubular member 40 is preferably transparent, for example, of a transparent plastic material such as polymethylmethacrylate. This allows an operator to observe the operation of the electrode 16 while the water shield 38 is in place.

Also in accordance with the present invention, a piston 48 is provided which has an outer periphery 50 in tight-fitting sliding relation with the inner wall portion 42 of the tubular member 40. The piston 48 is generally sealingly attached to the quill 12 adjacent the one end 14 of the quill 12. This prevents splashing liquid coolant from entering that portion of the interior tubular cavity 44 above the piston 48. In the particular embodiment illustrated, the piston 48 has a generally centrally located axially positioned and axially extending opening 52 which fits relatively tightly about the one end 14 of the quill 12. An annular lip 54 extends inwardly adjacent to one end of the opening 52 and fits against a shoulder 56 about the one end 14 of the quill 12. A collet 58 has a first end 60 which fits in the interior 26 of the quill 12 in generally sealing fit as provided, for example, by a sealing ring 62. A collet nut adapter 64 screws upon the one end 14 of the quill 12. A collet nut 66 then screws upon the collet nut adapter 64. The collet nut 66 has an interior tapered wall 68 which serves to tighten a grasping end 70 of the collet 60 about the electrode 16. An advantage of the present invention is that the collet 60, the collet nut adapter 64, and the collet nut 66 are those conventionally used with certain brands of metal disintegrators.

The piston 48, or more particularly the outer periphery 50 of piston 48, generally includes a pair of longitudinally spaced apart and parallel grooves 72 and 74, each of which includes a respective sealing ring 76, 78 generally of a polymeric material such as artificial rubber. This assures a sealing yet sliding fit between the inner wall 42 of the tubular member 40 and the outer periphery 50 of the piston 48 and also serves to provide wiping of the inner wall 42 of the tubular member 40 if the piston is moved appropriately. As the vibrator rod 24 oscillates longitudinally, it causes the piston 48 to which it is threadably attached, to oscillate longitudinally, which in turn causes the electrode 16 to vibrate longitudinally.

In accordance with the present invention, positioning means 80 are provided for selectively longitudinally positioning the tubular member 40 in releasably fixed relation relative to the electrode 16. In the particular mounting illustrated, the positioning means 80 includes a cover 82 which generally covers a second end 84 of the tubular member 40. The cover 82 includes a longitudinal opening 86 in which the quill 12 is slidably positionable. The positioning means 80 also includes fastening means 88 for selectively fastening the quill 12 in fixed relation to the cover 82. In the particular embodiment illustrated the fastening means 88 comprises a bolt 90 which is threadably connected to the cover 82 and which extends orthogonally to the quill 12. The bolt 90 is screwed inwardly and an end 92 thereof, generally of plastic or brass, bears against the quill 12, thus fastening it in place relative to the cover 82. In accordance with an embodiment of the present invention, the member 40 may have a notch 94 through which the bolt 90 fits, and a head 96 of the bolt 90 may be so sized as to bear against tubular member 40 when the end 92 of the bolt 90 bears against the quill 12. In this manner, a single bolt 90 can be used to fasten the member 40 to the quill 12. Thereby, the fastening means 88 serves not only for selectively fastening the quill 12 is fixed relation to the cover 82, but also for fastening the cover 82 in fixed relation to the tubular member 40.

In accordance with a preferred embodiment of the present invention, the water shield 38 can further include a deformable and flexible sleeve 98, generally of a diameter slightly greater than that of the one end 46 of the tubular member 40. The sleeve 98 may be, for example, a thin clear plastic bag having its bottom broken open. Attaching means 100 are provided for releasably attaching the sleeve 98 to extend longitudinally from the one end 46 of the tubular member 40 and to form an extension 102 of the interior tubular cavity 44. The attachment means 100 may include a simple elastomeric member 104, such as a rubber band. The sleeve 98, when used, provides a yet closer shielding of coolant splashed backwardly from the broken piece of metal 32 and the metallic member 34.

INDUSTRIAL APPLICABILITY

A water shield 38, in accordance with the present invention, is useful with any metal disintegrator 10, of the nature used conventionally for removing broken pieces of metal 32 which are embedded in metallic members 34. By use of the water shield 38, splashback of coolant is controlled so that the operator is not hit by the splashback and so that the coolant does not uncontrollably splash laterally so as to wet adjacent equipment.

The invention has been described in connection with certain embodiments thereof. It is to be understood that the invention is not meant to be limited thereby and covers such adaptations and modifications as may be apparent to one of ordinary skill in the art and as will become apparent from the specification, the drawings and the appended claims.

I claim:

1. A water shield (38) for use with a metal disintegrator (10), having a longitudinally extending quill (12) having one end (14) adapted to hold a longitudinally extending electrode (16), said electrode (16) having a discharge end (18) spaced from said quill (12), vibrating means (20) for longitudinally vibrating said electrode (16), and fluid delivery means (30) for delivering a stream of pressurized liquid coolant generally parallel to said electrode (16) and against a broken piece of metal (32) embedded in a metallic member (34), comprising:

a rigid tubular member (40) having an inner wall (42) defining an interior tubular cavity (44) positionable in surrounding relation about least said one end (14) of said quill (12) and having a first end portion (46) positionable generally adjacent said electrode (16), said tubular member (40) including a second end portion (84);

a piston (48) having an outer periphery (50) in tight-fitting sliding relation with said inner wall portion (42) and being generally sealingly attached to said quill (12) adjacent said one end (14) thereof; and positioning means (80) for selectively longitudinally positioning said tubular member (40) in releasably fixed relation relative to said electrode (16), said positioning means (80) including a cover (82) generally covering said second end portion (84) of said tubular member (40), said cover (82) including a longitudinal opening (86) in which said quill (12) is slidably positionable, and fastening means (88) for selectively fastening said quill (12) in fixed relation to said cover (82).

2. A water sheild (38) as set forth in claim 1, wherein said fastening means (88) also fastens said cover (82) in fixed relation to said tubular member (40).

3. A water shield (38) for use with a metal disintegrator (10), having a longitudinally extending quill (12) having one end (14) adapted to hold a longitudinally extending electrode (16), said electrode (16) having a discharge end (18) spaced from said quill (12), vibrating means (20) for longitudinally vibrating said electrode (16), and fluid delivery means (30) for delivering a stream of pressurized liquid coolant generally parallel to said electrode (16) and against a broken piece of metal (32) embedded in a metallic member (34), comprising:

a rigid tubular member (40) having an inner wall (42) defining an interior tubular cavity (44) positionable in surrounding relation about at least said one end (14) of said quill (12) and having a first end portion (46) positionable generally adjacent said electrode (16);

a piston (48) having an outer periphery (50) in tight-fitting sliding relation with said inner wall portion (42) and being generally sealingly attached to said quill (12) adjacent said one end (14) thereof; and positioning means (80) for selectively longitudinally positioning said tubular member (40) in releasably fixed relation relative to said electrode (16);

wherein said outer periphery of said piston (48) includes a pair of longitudinally spaced apart parallel grooves (72,74), and further including:

a pair of polymeric sealing rings (76,78), one in each of said grooves (72,74).

4. A water shield (38) as set forth in claim 1, wherein said tubular member (40) is transparent.

5. A water shield (38) as set forth in claim 1, further including a flexible sleeve (98) of a diameter slightly greater than that of said tubular member (40); and attaching means (100) for releasably attaching said sleeve (98) to extend longitudinally from said one end (46) of said tubular member (40) and to form an extension (102) of said interior tubular cavity (44).

6. In a metal disintegrator (10) which comprises a longitudinally extending quill (12) having one end (14) adapted to hold a longitudinally extending electrode (16), said electrode (16) having a discharge end (18) spaced from said quill (12), vibrating means (20) for longitudinally vibrating said electrode (16) and fluid delivery means (30) for delivering a stream of pressurized liquid coolant generally parallel to said electrode (16) and against a broken piece of metal (32) embedded in a metal member (34), an improvement comprising:

a tubular member (40) having an inner wall (42) defining an interior cavity (44) positioned in surrounding relation about at least said one end (14) of said quill (12) and having a first end portion (46) positionable generally adjacent said electrode (16), said tubular member (40) including a second end portion (84);

a piston (48) having an outer periphery (50) in tight-fitting sliding relation with said inner wall portion (42) and being generally sealingly attached to said quill (12) adjacent said one end (14) thereof; and positioning means (80) for selectively longitudinally positioning said tubular member (40) in releasably fixed relation relative to said electrode (16), said positioning means (80) including a cover (82) generally covering said second end portion (84) of said tubular member (40), said cover (82) including a longitudinal opening (86) in which said quill (12) is slidably positioned and fastening means (82) for selectively fastening said quill (12) in fixed relation to said cover (82).

7. An improved disintegrator (10) as set forth in claim 6, wherein said fastening means (88) also fastens said cover (82) in fixed relation to said tubular member (40).

8. An improved disintegrator (10) which comprises a longitudinally extending quill (12) having one end (14) adapted to hold a longitudinally extending electrode (16), said electrode (16) having a discharge end (18) spaced from said quill (12), vibrating means (20) for longitudinally vibrating said electrode (16) and fluid delivery means (30) for delivering a stream of pressurized liquid coolant generally parallel to said electrode (16) and against a broken piece of metal (32) embedded in a metal member (34), an improvement comprising:

a tubular member (40) having an inner wall (42) defining an interior cavity (44) positioned in surrounding relation about at least said one end (14) of said quill (12) and having a first end portion (46) positionable generally adjacent said electrode (16);

a piston (48) having an outer periphery (50) in tight-fitting sliding relation with said inner wall portion (42) and being generally sealingly attached to said quill (12) adjacent said one end (14) thereof; and positioning means (80) for selectively longitudinally positioning said tubular member (40) in releasably fixed relation relative to said electrode (16); and wherein said outer periphery (50) of said piston (48) includes a pair of longitudinally spaced apart parallel grooves (72,74); and further including:

a pair of polymeric sealing rings (76,78), one in each of said grooves (72,74).

9. An improved disintegrator (10) as set forth in claim 6, wherein said tubular member (40) is transparent.

10. An improved disintegrator (10) as set forth in claim 6, further including:

a flexible sleeve (98) of a diameter slightly greater than that of said tubular member (40); and attaching means (100) for releasably attaching said sleeve (98) to extend longitudinally from said one end (46) of said tubular member (40) and to form an extension (102) of said interior tubular cavity (44).

* * * * *